(12) United States Patent
S

(10) Patent No.: US 7,716,343 B2
(45) Date of Patent: May 11, 2010

(54) SYSTEM AND METHOD FOR OPERATING A NETWORKED SOFTWARE APPLICATION ON A NETWORK WITH SPORADIC CONNECTIVITY

(75) Inventor: Sudhir Krishna S, Bangalore (IN)

(73) Assignee: SAP AG, Walldorf (DE)

( * ) Notice: Subject to any disclaimer, the term of this patent is extended or adjusted under 35 U.S.C. 154(b) by 721 days.

(21) Appl. No.: 11/481,606

(22) Filed: Jul. 5, 2006

(65) Prior Publication Data

US 2007/0043691 A1     Feb. 22, 2007

(30) Foreign Application Priority Data

Aug. 22, 2005   (IN) .................. 2236/DEL/2005

(51) Int. Cl.
*G06F 15/16*        (2006.01)
(52) U.S. Cl. .................. 709/227; 709/228; 709/229
(58) Field of Classification Search .............. 709/218, 709/228, 227, 229; 713/200; 707/203
See application file for complete search history.

(56) References Cited

U.S. PATENT DOCUMENTS

| | | | | |
|---|---|---|---|---|
| 5,619,665 A | * | 4/1997 | Emma .................. | 712/208 |
| 5,924,094 A | * | 7/1999 | Sutter .................. | 707/10 |
| 5,935,212 A | * | 8/1999 | Kalajan et al. .............. | 709/228 |
| 6,115,742 A | * | 9/2000 | Franklin et al. ............. | 709/224 |
| 6,981,047 B2 | * | 12/2005 | Hanson et al. .............. | 709/227 |
| 7,376,741 B1 | * | 5/2008 | Carter et al. ................. | 709/228 |
| 7,577,749 B1 | * | 8/2009 | Long .......................... | 709/230 |
| 2002/0019844 A1 | * | 2/2002 | Kurowski et al. ........... | 709/201 |
| 2002/0078371 A1 | * | 6/2002 | Heilig et al. ................. | 713/200 |
| 2002/0103881 A1 | * | 8/2002 | Granade et al. ............. | 709/218 |
| 2002/0133598 A1 | * | 9/2002 | Strahm et al. ............... | 709/228 |
| 2004/0098472 A1 | * | 5/2004 | Styles et al. ................. | 709/221 |
| 2005/0172128 A1 | * | 8/2005 | Little et al. .................. | 713/168 |
| 2006/0200503 A1 | * | 9/2006 | Dosa et al. .................. | 707/203 |

\* cited by examiner

*Primary Examiner*—Cheyne D Ly
(74) *Attorney, Agent, or Firm*—Kenyon & Kenyon LLP

(57) ABSTRACT

A system and method for operating a networked software application on a network with sporadic connectivity is disclosed. A user may create in a client application on a user device business data transmission. The client application may transmit the order to a proxy module. A network detection module may check whether a network connection to a backend software application is available. If the network connection is available, the proxy module may transmit the order to a backend software application. The business data may be saved in the persistency module as it is being transmitted to the server. Otherwise, the proxy module may save the order in a persistency module. A middleware application may create a client specific subset of a set of master data stored with the backend software application. The middleware application may send the client specific subset to the proxy module. The proxy module may store the client specific subset in the persistency module to be used by the user in creating the order.

21 Claims, 7 Drawing Sheets

100

200

300

400

500

600

700

SYSTEM AND METHOD FOR OPERATING A NETWORKED SOFTWARE APPLICATION ON A NETWORK WITH SPORADIC CONNECTIVITY

BACKGROUND

The present invention relates to a system for transmitting business information, such as orders, from client applications to backend software applications and vice versa and, in particular, systems that have sporadic connectivity.

Modern business software applications leverage the capabilities of networked computers to both extend the reach of these computers and expand their capabilities. Records may be kept in a centralized location accessible by multiple users on multiple devices. At the same time, these records may be protected from unauthorized access. By accessing a network, networked devices with low processing may also offload their processing needs to a server. Using this method, these lighter and cheaper devices may still run highly sophisticated programs.

FIG. 1 illustrates a computerized network system 100 that is commonly used in the art. A user device 110 connects to a server 120 via a network 130. The user device 110 may use a thin client application 140 to access a backend software application 150. A thin client merely sends data to the backend software application 150, which performs all processing. An example of a thin client application 140 would be a web browser. Alternatively, the user device 110 may use a thick client application 160, in which some of the processing is performed on the user device 110 before sending any data to the backend software application 150 to be processed. A thick client 160 may store some of the data before transmitting the data to the backend software application 150. The thick client application 160 may store some of the data temporarily in a persistency module 170 also located on the user device 110. A persistency module 170 is a storage application that stores data for processing or for sending to the backend software application 150. A middleware application 180 may be used to control the access to the backend software application 150 by the client application.

This process becomes more complicated with devices that are not permanently connected to the network. This issue particularly arises for devices that connect to the server via a wireless network. Any wireless network, regardless of the range, is going to be subject to "dead zone" in which no connection is available. Thick client applications 140 may still operate in such an environment. FIG. 2 illustrates in a flowchart one method 200 commonly used to operate networked application in an environment with sporadic connectivity. The thick client application 160 creates a business data transmission (BDT) (Block 210). The business data may be any kind of data indicating an action for the backend software application 150 to perform. For example, the business data may be a part to be ordered from a central warehouse, a change as to the status of some item being tracked, a human resources file to be updated, or other action to be taken in the course of a business enterprise. The thick client application 160 then stores the BDT in the persistency module 170 (Block 220). The thick client application 160 then allows the user to trigger synchronization of the business data stored in the persistency module 170 with the backend software application 150 (Block 230). Synchronization may include updating the business data stored in the server by the backend software application 150 if the business data previously existed or adding the business data if it is new.

Some new innovations have been added to this method recently, such as applications that check for network availability and automatically link the user device 110 to an available network 130. FIG. 3 illustrates in a flowchart one method 300 commonly used to operate networked application with a network selection module in an environment with sporadic connectivity. The thick client application 160 allows the user to create a BDT (Block 310). The thick client application 160 then stores the BDT in the persistency module 170 (Block 320). A network selection module checks the availability of networks in the area of the user device 110 (Block 340). The thick application then triggers synchronization of the business data stored in the persistency module 170 with the backend software application 150 once a network connection is established (Block 340).

What is needed is a method of allowing for sporadic connectivity without requiring a thick client application being stored on the user device.

DETAILED DESCRIPTION

A system and method for operating a networked software application on a network with sporadic connectivity is disclosed. A user may organize business data in a client application on a user device. The client application may transmit the business data to a proxy module. A network detection module may check whether a network connection to a backend software application is available. If the network connection is available, the proxy module may transmit the business data to a backend software application. The business data may be saved in the persistency module as it is being transmitted to the server. Otherwise, the proxy module may save the business data in a persistency module. A middleware application may create a client specific subset of a set of master data stored with the backend software application. The middleware application may send the client specific subset to the proxy module. The proxy module may store the client specific subset in the persistency module to be used by the user in organizing and selecting business data.

Figure 1:
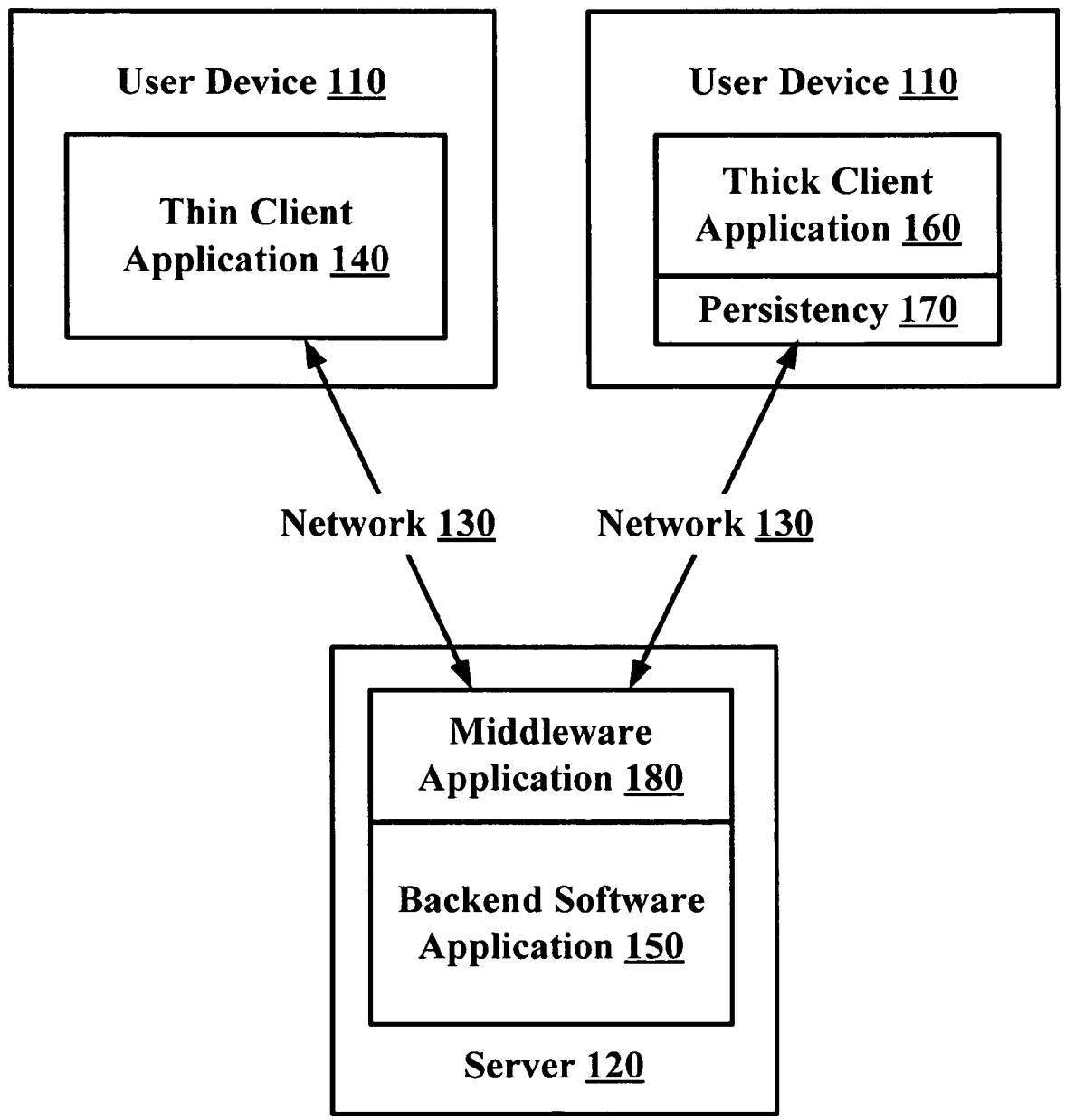
FIG. 1 illustrates a computerized network system that is commonly used in the art.
Figure 2:
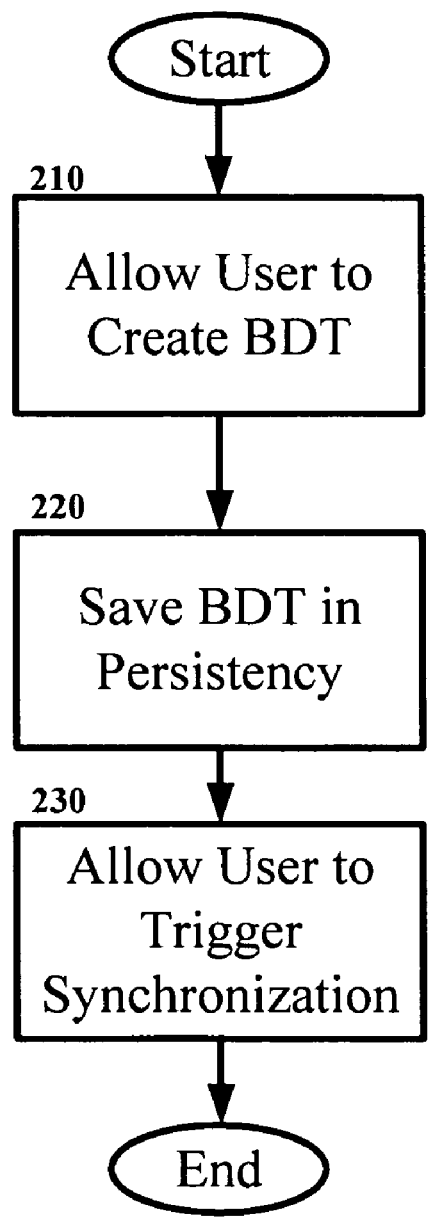
FIG. 2 illustrates in a flowchart one method commonly used to operate networked application in an environment with sporadic connectivity.
Figure 3:
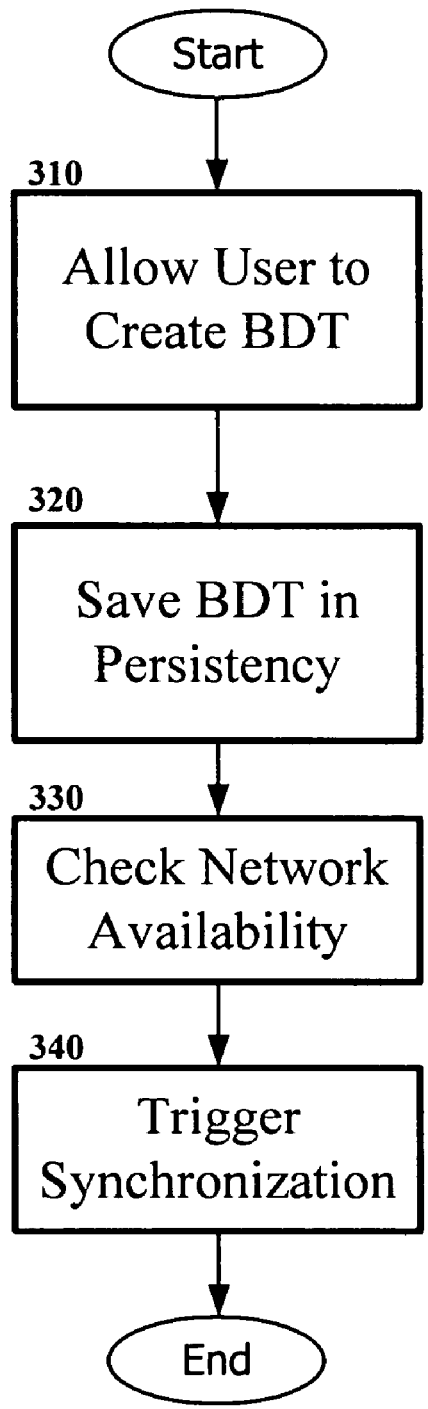
FIG. 3 illustrates in a flowchart one method 300 commonly used to operate networked application with a network selection module in an environment with sporadic connectivity.
Figure 4:
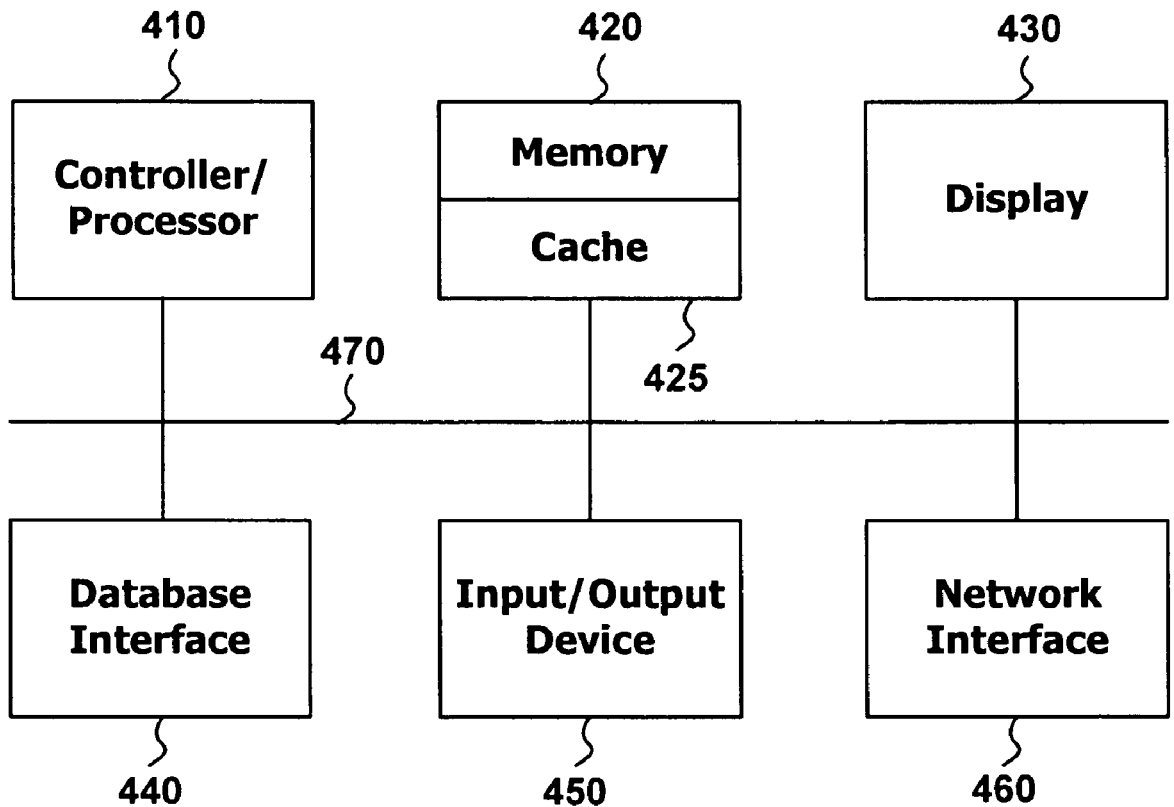
FIG. 4 illustrates a possible configuration of a computer system to act as a user device or server to execute the present invention.

FIG. 4 illustrates a possible configuration of a computer system 400 to act as a user device or server to execute the present invention. The computer system 400 may include a controller/processor 410, a memory 420 with a cache 425, display 430, database interface 440, input/output device interface 450, and network interface 460, connected through bus 470.

The controller/processor 410 may be any programmed processor known to one of skill in the art. However, the decision support method can also be implemented on a general-purpose or a special purpose computer, a programmed microprocessor or microcontroller, peripheral integrated circuit elements, an application-specific integrated circuit or other integrated circuits, hardware/electronic logic circuits, such as a discrete element circuit, a programmable logic device, such as a programmable logic array, field programmable gate-array, or the like. In general, any device or devices capable of implementing the decision support method as described herein can be used to implement the decision support system functions of this invention.

The memory 420 may include volatile and nonvolatile data storage, including one or more electrical, magnetic or optical memories such as a RAM, cache, hard drive, CD-ROM drive, tape drive or removable storage disk. The memory may have a cache 425 to speed access to specific data.

The Input/Output interface 450 may be connected to one or more input devices that may include a keyboard, mouse, pen-operated touch screen or monitor, voice-recognition device, or any other device that accepts input. The Input/Output interface 450 may also be connected to one or more output devices, such as a monitor, printer, disk drive, speakers, or any other device provided to output data.

The network interface 460 may be connected to a communication device, modem, network interface card, a transceiver, or any other device capable of transmitting and receiving signals over a network. The components of the computer system 400 may be connected via an electrical bus 470, for example, or linked wirelessly.

Client software and databases may be accessed by the controller/processor 410 from memory 420 or through the database interface 440, and may include, for example, database applications, word processing applications, the client side of a client/server application such as a billing system, as well as components that embody the decision support functionality of the present invention. The computer system 400 may implement any operating system, such as Windows or UNIX, for example. Client and server software may be written in any programming language, such as ABAP, C, C++, lava or Visual Basic, for example.

Figure 5:
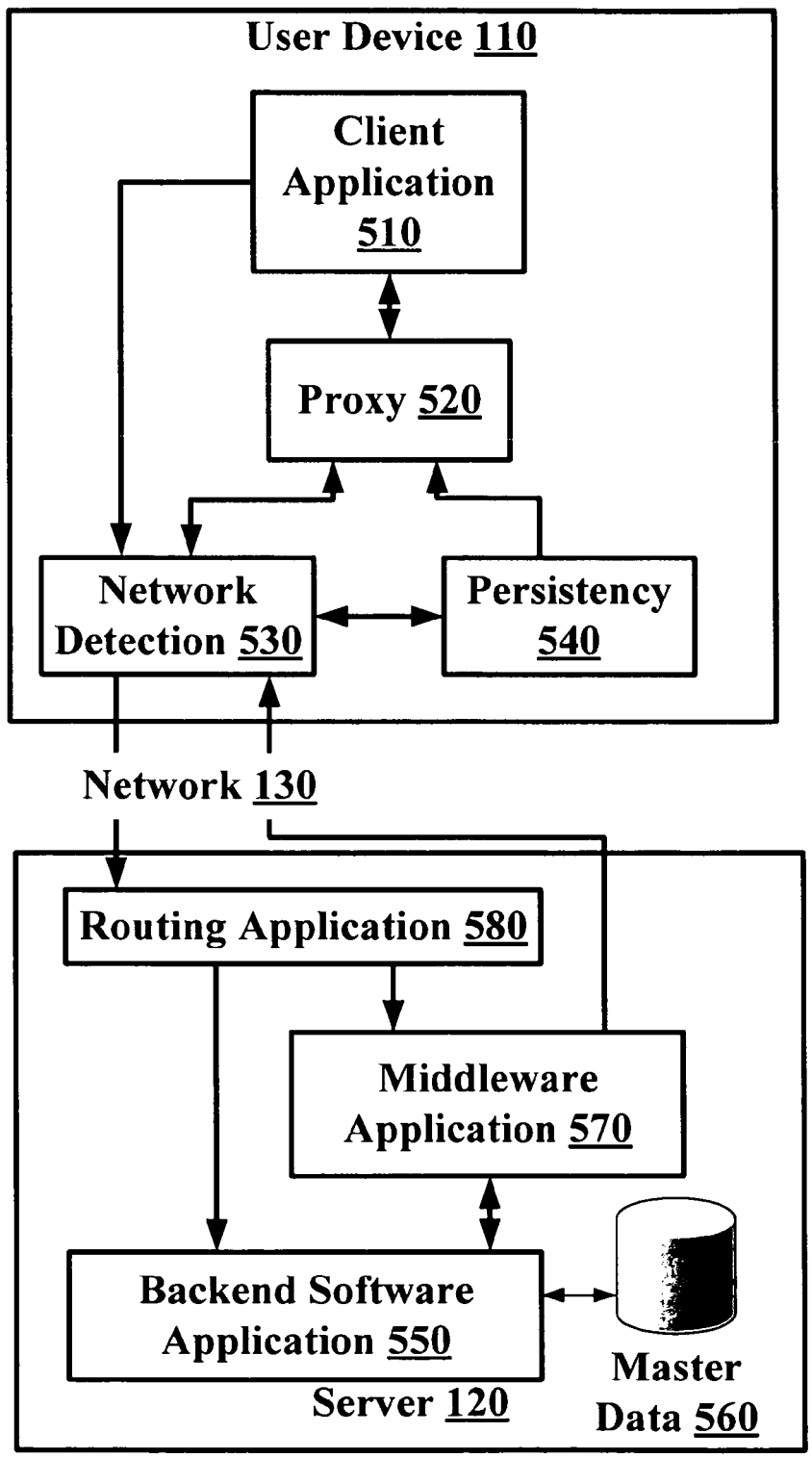
FIG. 5 illustrates in a block diagram one embodiment of the networked computer device according to the present invention.

FIG. 5 illustrates in a block diagram one embodiment of the networked computer device 500 according to the present invention. As before, a user device 110 may be connected to a server 120 via a network 130. The user device 110 may be a user terminal, a desktop personal computer, a laptop computer, or a handheld device such as a palmtop computer or bar code scanner. The server 120 may be any computerized device configured to perform processing or store data for a second computerized device. The network may be a local area network, a wide area network, a wireless network, a general packet radio service, a global system for mobile communications, or other type of network, whether wired or wireless.

The user device 110 may execute a client application 510 to interact with the user. The client application 510 may be a thin client application or a thick client application. The client application 510 may present data to the user necessary to perform an activity such as creating business data transmission. The client application 510 may receive from the user inputs necessary to create the business data transmission. The client application 510 may be a thin client application or a thick client application. The client application 510 connects to a proxy module 520. The proxy module 520 may be an application that emulates a backend software application. The client application 510 may send the business data transmission to the proxy module 520. The proxy module 520 may then connect with a network detection module 530 to determine if a network connection 130 is available. If no connection is available, the business data transmission is stored in the persistency module 540. If a connection is available, the business data transmission may be forwarded onto the server 120 and stored in the persistency module 540. If a fixed connection is present, such as a permanent wired connection where connectivity is not going to be a problem, the network detection module 530 may send a signal via the proxy module 520 to the client application 510. The client application 510 may then bypass the proxy module 520 until such time as a signal is sent by the network detection module 530 that the network connection 130 is no longer available.

The server 120 may execute a backend software application 550 to process the business data transmission sent by the user device 110. The backend software application 550 may also store a set of master data 560 to aid in the processing of the business data transmission. A middleware application 560 may be used to coordinate interaction between the client application 510 and the backend software application 550. A routing application 580 may be used to determine if incoming business data transmission is a new business data transmission or a modification of an existing current business data process already stored with the backend software application. If the incoming business data transmission is part of a new order, it may be sent directly to the backend software application 550. If the incoming business data transmission is a modification of an existing business data process, it may be sent to the middleware application for synchronization.

In addition to synchronizing incoming business data transmissions with business data processes, the middleware application 570 may also cull a client-specific subset of data from the set of master data 560 using a set of distribution rules. The client-specific subset of data may then be forwarded to the user device 110 for storage in the persistency module 540. The client-specific subset of data may then be presented to the user by the client application 510 to assist in the creation of an order.

Figure 6:
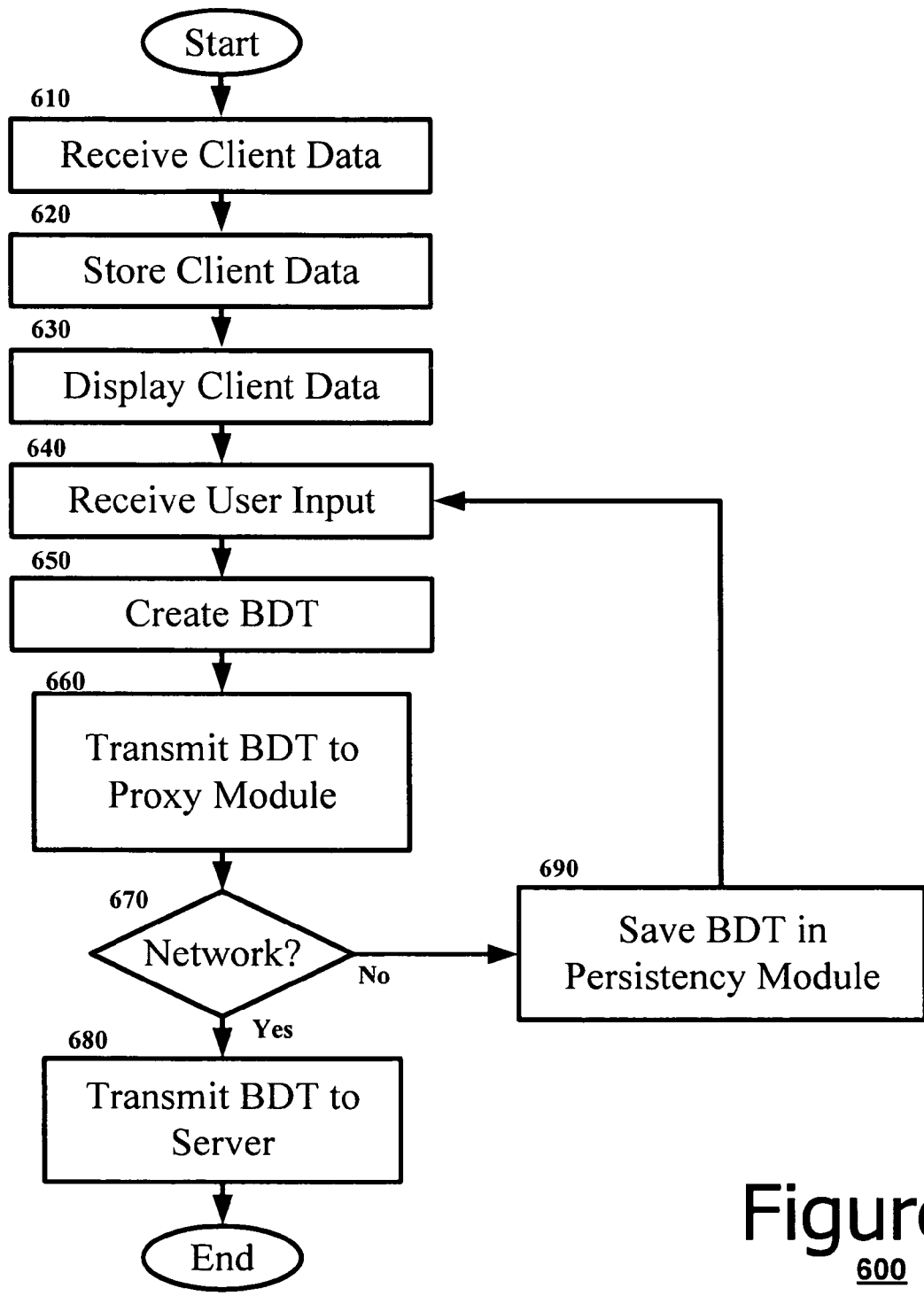
FIG. 6 illustrates in a flowchart a method for operating the user device 110 according to the present invention.

FIG. 6 illustrates in a flowchart a method 600 for operating the user device 110 according to the present invention. The user device 110 may receive the client-specific subset of data from the server 120 (Block 610). The user device 110 may store the client-specific subset of data in the persistency module 540 (Block 620). The user device 110 may display any required data from the client-specific subset of data to the user (Block 630). The user device may receive user input into the client application 510 (Block 640), and then the client application 510 may create the business data transmission (BDT) by organizing the user input (Block 650). The BDT is transmitted from the client application 510 to the proxy module 520 (Block 660). The network detection module 530 then determines if a network connection 130 is available (Block 670). If no network connection 130 is available, the proxy module may save the BDT in the persistency module 540 (Block 690), and the user device may await the next user command (Block 640). If a network connection is available, the BDT is transmitted to the server 130 (Block 680). The BDT may be saved in the persistency module 540 as it is being transmitted to the server 120.

Figure 7:
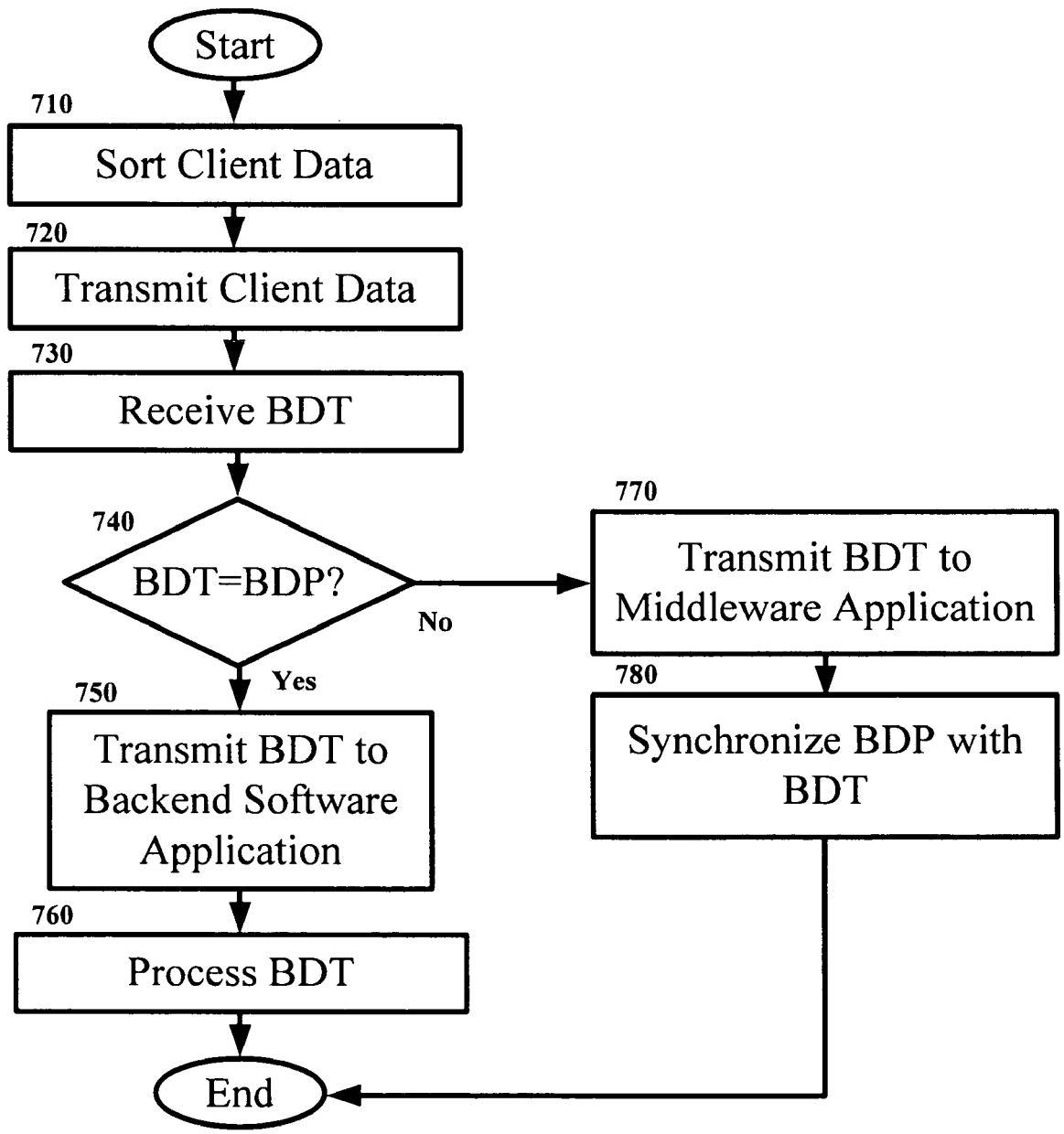
FIG. 7 illustrates in a flowchart a method for operating the server 120 according to the present invention.

FIG. 7 illustrates in a flowchart a method 700 for operating the server 120 according to the present invention. The middleware application 570 may sort out a client-specific subset of data from the master data 560 (Block 710). The middleware application 570 may then transmit the client-specific subset of data to the appropriate user device 110 (Block 720). The routing application 580 then may receive a BDT from the user device 120 (Block 730). The routing application 580 may then check to see if the BDT is a modification to an existing business data process (BDP) (Block 740). This may be accomplished by assigning an order number at the user device 110 that is then maintained in the server 120, or by some other method. If the BDT is new, the routing application 580 may route the BDT to the backend software application 550 (Block 750). The backend software application 550 then may process the BDT. If the BDT is a modification of an existing BDP, then the routing application 580 may route the BDT to the middleware application 570 (Block 770). The middleware application 570 may then synchronize the BDP with the BDT (Block 780).

Several embodiments of the present invention are specifically illustrated and described herein. However, it will be appreciated that modifications and variations of the present invention are covered by the above teachings and within the purview of the appended claims without departing from the spirit and intended scope of the invention.

What is claimed is:

1. A method of managing data that is received on a client device from a server device over a sporadic network connection, wherein the client device is configured to support a client application, a proxy module, a network detector, and a persistency module, and the server device is configured to support a backend software application and a middleware application, the method comprising:
   receiving user input for creating an order in the client application;
   creating a business data transmission using the client application based on the user input;
   transmitting the business data transmission from the client application to the proxy module that emulates the backend software application;
   determining using the network detector whether the network connection to the server device is available;
   if the network connection is available, transmitting the business data transmission from the proxy module to the backend software application via the network; and
   otherwise, saving the business data transmission from the proxy module in the persistency module;
   receiving, by the network detector from the server device, data representing a client specific subset, the client specific subset having been culled by the middleware from a set of master data using a set of distribution rules;
   storing the data representing the client specific subset in the persistency module; and
   presenting through the proxy module and the client application the client specific subset to the user to assist the creation of the order.

2. The method of claim 1, further comprising:
   receiving in the proxy module the client specific subset of the set of master data stored with the backend software application; and
   storing the client specific subset in the persistency module to be used to create the business data transmission.

3. The method of claim 1, wherein the middleware application synchronizes the business data transmission with a business data process stored in the backend application.

4. The method of claim 3, wherein:
   a routing module determines whether the business data transmission is an altered version of the business data process; and
   if the business data transmission is an altered version of the business data process, sending the business data transmission to the middleware application to be synchronized with the business data process; or
   else sending the business data transmission to the backend software application to be processed.

5. The method of claim 1, further comprising bypassing the proxy module to send the business data transmission from the client application to the back end software application if the client application is connected by a dedicated network connection.

6. Computer readable medium stored thereon a set of program instructions that, when executed by a client device, cause the client device to:
   receive user input for creating an order in a client application;
   create a business data transmission using the client application based on the user input;
   transmit the business data transmission from the client application to a proxy module that emulates the backend software application;
   determine using a network detector whether a network connection to a server device from the client device is available;
   if the network connection is available, transmit the business data transmission from the proxy module to the backend software application via the network; and
   otherwise, save the business data transmission from the proxy module in the persistency module,
   receive, by the network detector from the server device, data representing a client specific subset, the client specific subset having been culled by a middleware on the server device from a set of master data using a set of distribution rules;
   store the data representing the client specific subset in the persistency module; and
   present through the proxy module and the client application the client specific subset to the user to assist the creation of the order.

7. The set of program instructions of claim 6, further comprising:
   receiving in the proxy module the client specific subset of the set of master data stored with the backend software application; and
   storing the client specific subset in the persistency module to be used to create the business data transmission.

8. The set of instructions of claim 6, wherein the middleware application synchronizes the business data transmission with a business data process stored in the backend application.

9. The set of instructions of claim 8, wherein:
   a routing module determines whether the business data transmission is an altered version of the business data process; and
   if the business data transmission is an altered version of the business data process, sending the business data transmission to the middleware application to be synchronized with the business data process; or
   else sending the business data transmission to the backend software application to be processed.

10. The set of instructions of claim 6, further comprising bypassing the proxy module to send the business data transmission from the client application to the back end software application if the client application is connected by a dedicated network connection.

11. A user device comprising:
    a transceiver to connect to a server via a network connection;
    a user interface to receive user input;
    a client application to create a business data transmission based on the user input;

a network detection module to check whether the network connection to a server executing a backend software application is available;

a persistency module to store the business data transmission if no network connection is available; and a proxy module to receive the business data transmission and transmit the business data transmission to the backend software application if the network connection is available and otherwise to the persistency module, wherein the proxy module emulates the backend software application, wherein responsive to user input for creating an order and transmission of the business data transmission to the backend software application, the network detection module receives from the server data representing a client specific subset, the client specific subset having been culled by a middleware on the server from a set of master data using a set of distribution rules, the persistency module stores the data representing the client specific data; and the client application through the proxy module presents the client specific subset to the user to assist the creation of the order.

12. The user device of claim 11, wherein the proxy module receives from the middleware application the client specific subset of the set of master data stored with the backend software application and stores the client specific subset in the persistency module to be used to create the business data transmission.

13. The user device of claim 11, wherein a middleware application to synchronize the business data transmission with a business data process stored in the backend application.

14. The user device of claim 13, wherein a routing module determines whether the business data transmission is an altered version of the business data process and sends the business data transmission to the middleware application to be synchronized with the business data process if the business data transmission is an altered version of the business data process or else sends the business data transmission to the backend software application to be processed.

15. The user device of claim 11 wherein the client application sends the business data transmission to the back end software application bypassing the proxy module if the client application is connected by a dedicated network connection.

16. A computer network comprising:
a server to execute:
a backend software application that is stored with a master data; and
a middleware application to cull a client specific subset from the master data using a set of distribution rules;

a user device to execute:
a client application to create a business data transmission based on user input;
a network detection module to check whether a network connection to the server is available;
a persistency module to store the business data transmission if no network connection is available; and
a proxy module to receive the business data transmission and transmit the business data transmission to the backend software application if the network connection is available and otherwise to the persistency module, wherein the proxy module emulates the backend software application,
wherein responsive to user input for creating an order and transmission of the business data transmission to the backend software application,
the network detection module receives from the server data representing the client specific subset,
the persistency module stores the data representing the client specific data; and
the client application through the proxy module presents the client specific subset to the user to assist the creation of the order.

17. The computer network of claim 16, wherein a middleware application creates the client specific subset of the master data stored with the backend software application and transmits the client specific subset to the proxy module to be stored in the persistency module to be used by the user in creating the business data transmission.

18. The computer network of claim 16, wherein the server executes the middleware application to synchronize the business data transmission with a business data process stored in the backend application.

19. The computer network of claim 18, wherein the server executes a routing module to determine whether the business data transmission is an altered version of the business data process and to send the business data transmission to the middleware application to be synchronized with the business data process if the business data transmission is an altered version of the business data process or else to the backend software application to be processed.

20. The computer network of claim 16, wherein the client application sends the business data transmission to the back end software application bypassing the proxy module if the client application is connected by a dedicated network connection.

21. The method of claim 1, wherein the set of master data is stored with the backend software application.

* * * * *